(12) United States Patent
Pan et al.

(10) Patent No.: US 9,596,052 B2
(45) Date of Patent: Mar. 14, 2017

(54) METHOD AND DEVICE FOR TRANSMITTING MCS INDICATION INFORMATION

(71) Applicant: China Academy of Telecommunications Technology, Beijing (CN)

(72) Inventors: Xueming Pan, Beijing (CN); Zukang Shen, Beijing (CN); Jing Xu, Beijing (CN); Guojun Xiao, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 132 days.

(21) Appl. No.: 14/417,361

(22) PCT Filed: Jul. 26, 2013

(86) PCT No.: PCT/CN2013/080185
§ 371 (c)(1),
(2) Date: Jan. 26, 2015

(87) PCT Pub. No.: WO2014/015829
PCT Pub. Date: Jan. 30, 2014

(65) Prior Publication Data
US 2015/0200746 A1     Jul. 16, 2015

(30) Foreign Application Priority Data

Jul. 27, 2012 (CN) .......................... 2012 1 0265405

(51) Int. Cl.
*H04L 1/00* (2006.01)
*H04W 72/04* (2009.01)

(52) U.S. Cl.
CPC .............. *H04L 1/0003* (2013.01); *H04L 1/00* (2013.01); *H04L 1/0016* (2013.01);
(Continued)

(58) Field of Classification Search
None
See application file for complete search history.

(56) References Cited

U.S. PATENT DOCUMENTS 8,995,929 B2 * 3/2015 Chen ........................... 370/252
2006/0287743 A1 12/2006 Sampath et al.
(Continued)

FOREIGN PATENT DOCUMENTS

CN     101243625 A     8/2008
CN     101674149 A     3/2010
(Continued)

OTHER PUBLICATIONS

Extended European Search Report for EP Application No. 13823604.7 mailed Dec. 14, 2015.
(Continued)

*Primary Examiner* — Brian Roberts
(74) *Attorney, Agent, or Firm* — Foley & Lardner LLP; James F. Ewing; Paul M. H. Pua

(57) ABSTRACT

The present application relates to the field of wireless communications, and in particular, to an indication method and device for a modulation coding scheme. It is for solving the problem that in an existing LTE/LTE-A system, a higher-order modulation scheme cannot be supported, thereby limiting the further improvement of throughput in an application scenario of a high signal-to-noise ratio. The method of the embodiments of the present application includes: according to the channel quality and a first MCS table, a network side determining an MCS level corresponding to a channel scheduled for a UE; and by means of first indication information, notifying the UE of the determined MCS level, so as to indicate to the UE to determine a modulation scheme and code rate for the channel scheduled therefor according to the MCS grade, wherein there are at least corresponding entries of MCS indexes and TBS indexes corresponding to
(Continued)

modulation schemes at higher modulation orders than 6 in the first MCS table. The embodiments of the present application introduce a higher-order modulation scheme into an existing LTE/LTE-A system, improving the spectrum efficiency.

17 Claims, 1 Drawing Sheet

(52) U.S. Cl.
CPC .......... *H04L 1/0025* (2013.01); *H04L 1/0026* (2013.01); *H04L 1/0033* (2013.01); *H04W 72/042* (2013.01); *H04L 2001/0092* (2013.01)

(56) References Cited

U.S. PATENT DOCUMENTS

| | | | |
|---|---|---|---|
| 2007/0259671 A1 | 11/2007 | Cheng et al. | |
| 2010/0023830 A1 | 1/2010 | Wengerter et al. | |
| 2010/0150096 A1 | 6/2010 | Choi et al. | |
| 2010/0195614 A1 | 8/2010 | Nimbalker et al. | |
| 2012/0076023 A1* | 3/2012 | Ko | H04B 7/0486 370/252 |
| 2015/0295677 A1* | 10/2015 | Ding | H04W 8/24 370/329 |

FOREIGN PATENT DOCUMENTS

| | | |
|---|---|---|
| CN | 102124693 | 7/2011 |
| CN | 102349339 A | 2/2012 |
| CN | 102571261 A | 7/2012 |
| CN | 102611536 A | 7/2012 |
| CN | 102624481 A | 8/2012 |
| CN | 102684816 A | 9/2012 |
| CN | 103297181 A | 9/2013 |
| EP | 1 845 742 A1 | 10/2007 |
| EP | 2066058 | 6/2009 |
| EP | 2 817 907 A1 | 12/2014 |
| WO | WO-2008/111014 | 9/2008 |
| WO | WO-2011/032274 | 3/2011 |
| WO | WO-2013/123961 A1 | 8/2013 |

OTHER PUBLICATIONS

International Search Report for PCT/CN2013/080185 mailed Oct. 31, 2013.

Anonymous: "Modulation order—Wikipedia, the free encyclopedia", Jun. 19, 2015, XP055196972, Retrieved from the Internet: URL: https://en.wikipedia.org/wiki/Modulation_order [retrieved on Jun. 19, 2015] *the whole document*.

Supplementary Partial European Search Report for EP 13823604 dated Jul. 2, 2015 (8 pages).

* cited by examiner

METHOD AND DEVICE FOR TRANSMITTING MCS INDICATION INFORMATION

This application is a US National Stage of International Application No. PCT/CN2013/080185, filed on 26 Jul. 2013, designating the United States, and claiming the benefit of Chinese Patent Application No. 201210265405.9, filed with the Chinese Patent Office on Jul. 27, 2012 and entitled "Method and device for transmitting MCS indication information", which is hereby incorporated by reference in its entirety.

FIELD OF THE INVENTION

The present invention relates to the field of wireless communications and particularly to a method and device for transmitting Modulation and Coding Scheme (MCS) indication information.

BACKGROUND OF THE INVENTION

In a Long Term Evolution (LTE) system and a Long Term Evolution-Advanced (LTE-A) system, the technology of Adaptive Modulation and Coding (AMC) is applied to both downlink and uplink traffic channels to determine modulation schemes and code rates dependent upon conditions of the channels for improving spectrum efficiency of the system. Three modulation schemes, i.e., Quaternary Phase Shift Keying (QPSK), 16 Quadrature Amplitude Modulation (16 QAM) and 64 QAM, are supported in existing LTE Release-8/9/10/11 systems, where the amounts of information transported per modulated symbol in the respective modulation schemes are 2, 4 and 6 bits respectively.

The three modulation schemes above can be supported by a Physical Downlink Shared Channel (PDSCH) among the downlink traffic channels in the LTE Rel-8/9/10 systems, and each combination of a modulation scheme and a code rate corresponds to an MCS level; and 29 MCS levels are defined in the $3^{rd}$ Generation Partnership Project (3GPP) LTE Rel-11 and earlier releases as depicted in Table 1 which is a table of modulation orders and Transport Block Size (TBS) indexes of a PDSCH (simply an MCS table), where modulation orders and TBS indexes corresponding to different MCS levels in downlink scheduling are defined. In Table 1, the MCS index 0 represents a first MCS level; the MCS index 1 represents a second MCS level; and so on.

A UE is notified by the network side of a determined MCS level in 5-bit indication information in Downlink Control Information (DCI), and the UE knows a modulation scheme and a code rate used by a base station to transmit data over a PDSCH according to the MCS level indicated by the indication information received over a Physical Downlink Control Channel (PDCCH) and determines a modulation order and a TBS index corresponding to the MCS level according to the correspondence in Table 1 to determine a transport block size in the PDSCH and to demodulate and decode the data in the PDSCH.

TABLE 1

| MCS Index $I_{MCS}$ | Modulation Order $Q_m$ | TBS Index $I_{TBS}$ |
| --- | --- | --- |
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

In the meantime, the UE needs to measure on the downlink channel and to feed a Channel Quality Indicator (CQI) back to the base station by transmitting a recommended modulation scheme and code rate over a Physical Uplink Shared Channel (PUSCH) or a Physical Uplink Control Channel (PUCCH); and the base station determines MCS's corresponding to the uplink/downlink channels according to the CQI fed back by the UE and a predication algorithm. The modulation schemes and the code rates are quantified, in the 3GPP LTE Rel-11 and earlier releases, into 15 CQI levels defined in the form of a 4-bit table, i.e., a CQI table as depicted in Table 2 in which modulation schemes, code rates and spectrum efficiencies corresponding to different CQI levels are defined. In Table 2, the CQI index 0 represents a first CQI level; the CQI index 1 represents a second CQI level; and so on.

TABLE 2

| CQI Index | Modulation Scheme | Code rate × 1024 | Spectrum Efficiency |
| --- | --- | --- | --- |
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

The three modulation schemes above are also supported over an uplink traffic channel PUSCH in the LTE, and 29

MCS levels are also defined in the 3GPP LTE Rel-11 and earlier releases as depicted in Table 3 which is a table of modulation, TBS indexes and redundancy version numbers of a PUSCH (simply an MCS table), where modulation orders and TBS indexes corresponding to different MCS levels in uplink scheduling are defined. A UE is notified by the network side of a determined MCS level in 5-bit indication information in DCI, so the UE knows a modulation scheme and a code rate for a PUSCH scheduled by a base station for the UE according to the MCS level indicated by the indication information received over a PDCCH and determines a modulation order and a TBS index corresponding to the MCS level according to the correspondence in Table 3 to determine a transport block size in the PUSCH and to code and modulate the data in the PUSCH.

TABLE 3

| MCS Index $I_{MCS}$ | Modulation Order $Q'_m$ | TBS Index $I_{TBS}$ | Redundancy Version Number $rv_{idx}$ |
|---|---|---|---|
| 0 | 2 | 0 | 0 |
| 1 | 2 | 1 | 0 |
| 2 | 2 | 2 | 0 |
| 3 | 2 | 3 | 0 |
| 4 | 2 | 4 | 0 |
| 5 | 2 | 5 | 0 |
| 6 | 2 | 6 | 0 |
| 7 | 2 | 7 | 0 |
| 8 | 2 | 8 | 0 |
| 9 | 2 | 9 | 0 |
| 10 | 2 | 10 | 0 |
| 11 | 4 | 10 | 0 |
| 12 | 4 | 11 | 0 |
| 13 | 4 | 12 | 0 |
| 14 | 4 | 13 | 0 |
| 15 | 4 | 14 | 0 |
| 16 | 4 | 15 | 0 |
| 17 | 4 | 16 | 0 |
| 18 | 4 | 17 | 0 |
| 19 | 4 | 18 | 0 |
| 20 | 4 | 19 | 0 |
| 21 | 6 | 19 | 0 |
| 22 | 6 | 20 | 0 |
| 23 | 6 | 21 | 0 |
| 24 | 6 | 22 | 0 |
| 25 | 6 | 23 | 0 |
| 26 | 6 | 24 | 0 |
| 27 | 6 | 25 | 0 |
| 28 | 6 | 26 | 0 |
| 29 | reserved | | 1 |
| 30 | | | 2 |
| 31 | | | 3 |

The concept of a small cell has been proposed and gained significant attention along with the evolution of the technology. The small cell has a smaller coverage area and lower transmitting power, and the rate at which the UE transmits data can be improved by deploying the small cell at a closer location to the UE (e.g., indoors, in a hotspot area, etc.).

In the small cell, there is such a shorter distance between the UE and the base station that there are typically higher uplink and downlink Signal to Noise Ratios (SNR's). A study showed that when SNR is higher (e.g., above 20 dB), using a modulation at a higher order (e.g., 256 QAM, etc.) can be benificial for further improving the throughout. In view of this, the introduction of a modulation scheme at a higher order to the LTE/LTE-A system is a feasible technical solution.

In summary, no modulation scheme at a higher order can be supported in the existing LTE/LTE-A system, thus discouraging the throughput from being further improved in an application scenario with a high SNR.

SUMMARY OF THE INVENTION

A method and device for transmitting MCS indication information according to embodiments of the invention is provided, which is used to address the problem that no modulation scheme at a higher order can be supported in the existing LTE/LTE-A system and thus discouraging the throughput from being further improved in an application scenario with a high signal to noise ratio.

A method for transmitting Modulation and Coding Scheme (MCS) indication information according to an embodiment of the invention includes:
  determining, by a network side, a MCS level corresponding to a channel scheduled by the network side for a UE, according to channel quality and a first MCS table;
  notifying, by the network side, the UE of the determined MCS level in first indication information to instruct the UE to determine a modulation scheme and a code rate for the channel according to the MCS level;
  wherein there are at least corresponding entries of MCS indexes and Transport Block Size (TBS) indexes corresponding to modulation schemes at higher modulation orders than 6 in the first MCS table, and there is a one-to-one correspondence between MCS indexes and MCS levels.

A method for receiving MCS indication information according to an embodiment of the invention includes:
  receiving, by a UE, first indication information transmitted from a network side;
  determining, by the UE, a modulation scheme and a code rate for a channel scheduled by the network side for the UE, according to a first MCS table and an MCS level indicated in the first indication information;
  wherein there are at least corresponding entries of MCS indexes and Transport Block Size (TBS) indexes corresponding to modulation schemes at higher modulation orders than 6 in the first MCS table, and there is a one-to-one correspondence between MCS indexes and MCS levels.

A network-side device for transmitting MCS indication information according to an embodiment of the invention includes:
  a determining module configured to determine an MCS level corresponding to a channel scheduled by the network-side device for a UE, according to channel quality and a first MCS table; and
  an instructing module configured to notify the UE of the determined MCS level in first indication information to instruct the UE to determine a modulation scheme and a code rate for the channel according to the MCS level;
  wherein there are at least corresponding entries of MCS indexes and Transport Block Size (TBS) indexes corresponding to modulation schemes at higher modulation orders than 6 in the first MCS table, and there is a one-to-one correspondence between MCS indexes and MCS levels.

A User Equipment (UE) for receiving MCS indication information according to an embodiment of the invention includes:
  a receiving module configured to receive first indication information transmitted from a network-side device; and
  a processing module configured to determine a modulation scheme and a code rate for a channel scheduled by the network-side device for the UE, according to a first MCS table and an MCS level indicated in the first indication information;

wherein there are at least corresponding entries of MCS indexes and Transport Block Size (TBS) indexes corresponding to modulation schemes at higher modulation orders than 6 in the first MCS table, and there is a one-to-one correspondence between MCS indexes and MCS levels.

A base station according to an embodiment of the invention includes a processor and a data transceiver interface, wherein:

the processor is configured to determine a Modulation and Coding Scheme (MCS) level corresponding to a channel scheduled by the base station for a UE, according to channel quality and a first MCS table; and to notify the UE of the determined MCS level in first indication information to instruct the UE to determine a modulation scheme and a code rate for the channel according to the MCS level; where there are at least corresponding entries of MCS indexes and Transport Block Size (TBS) indexes corresponding to modulation schemes at higher modulation orders than 6 in the first MCS table, and there is a one-to-one correspondence between MCS indexes and MCS levels;

the data transceiver interface is configured to communicate data between the processor and the UE.

A User Equipment (UE) according to an embodiment of the invention includes a processor and a data transceiver interface, wherein:

the processor is configured to receive first indication information transmitted from a base station; and to determine a modulation scheme and a code rate for a channel scheduled by the base station for the UE, according to a first MCS table and an MCS level indicated in the first indication information; where there are at least corresponding entries of MCS indexes and Transport Block Size (TBS) indexes corresponding to modulation schemes at higher modulation orders than 6 in the first MCS table, and there is a one-to-one correspondence between MCS indexes and MCS levels;

the data transceiver interface is configured to communicate data between the processor and the base station.

In the embodiments of the invention, the network side determines an MCS level corresponding to a channel scheduled for the UE according to channel quality and a first MCS table; and notifies the UE of the determined MCS level in the first indication information to instruct the UE to determine the modulation scheme and the code rate for the channel according to the MCS level; where there are corresponding entries of MCS indexes and TBS indexes corresponding to modulation schemes at higher modulation orders than 6 in the first MCS table, and there is a one-to-one correspondence between MCS indexes and MCS levels. In the embodiments of the invention, the modulation schemes at the higher orders are introduced to the existing LTE/LTE-A system to thereby improve the throughout so as to improve the spectrum efficiency.

DETAILED DESCRIPTION OF THE EMBODIMENTS

A method for transmitting MCS indication information according to an embodiment of the invention is applied to support the introduction of modulation schemes at higher modulation orders than the highest modulation order in the MCS table specified in the existing 3GPP LTE Rel-11 and earlier releases (referred to as a second MCS table in the embodiments of the invention) (e.g., 256 QAM at the modulation order 8, etc.) and creation of an MCS table in which there are corresponding entries of MCS indexes and TBS indexes corresponding to the modulation schemes at the higher modulation orders (referred to as a first MCS table in the embodiments of the invention), where the first MCS table in the embodiments of the invention can be used instead of or in addition to the original second MCS table.

The embodiments of the invention will be described below in details with reference to the drawings.

Figure 1:
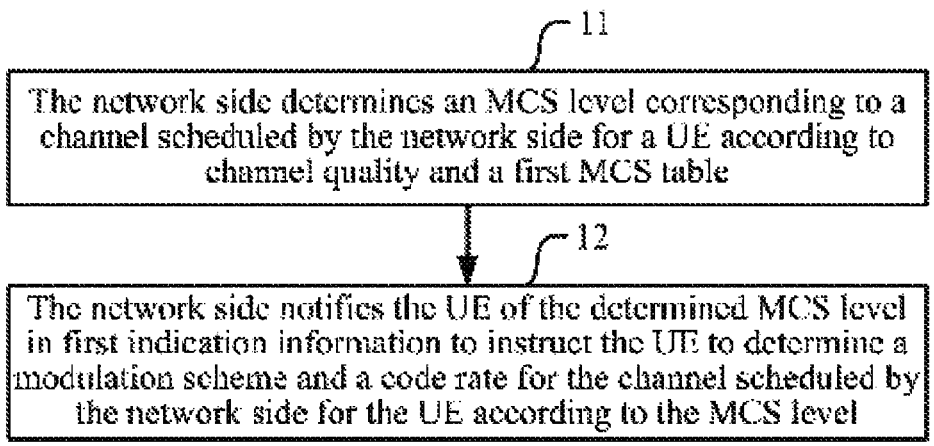
FIG. 1 is a flow chart of a method for transmitting MCS indication information according to an embodiment of the invention.

Referring to FIG. 1, a method for transmitting Modulation and Coding Scheme (MCS) indication information according to an embodiment of the invention includes the operations of:

In operation 11, the network side determines an MCS level corresponding to a channel scheduled by the network side for a UE according to channel quality and a first MCS table; and In operation 12, the network side notifies the UE of the determined MCS level in first indication information, to instruct the UE to determine a modulation scheme and a code rate for the channel scheduled by the network side for the UE according to the MCS level;

Where there are a plurality of entries in the first MCS table, each of which includes correspondence between an MCS index, a modulation order and a TBS index, and there is a one-to-one correspondence between MCS indexes and MCS levels; and there are at least corresponding entries of MCS indexes and TBS indexes corresponding to modulation schemes at higher modulation orders than 6 in the first MCS table.

Further, if there is also a second MCS table which is an MCS table specified in the 3GPP LTE Rel-11 and earlier releases, then the network side particularly determines the MCS level corresponding to the channel scheduled by the network side for the UE according to the channel quality, the first MCS table and the second MCS table, and then when the network side notifies the UE of the determined MCS level in the first indication information the operation 12 further comprises:

The network side instructs the UE in second indication information to use the first MCS table or the second MCS table when the UE determines the modulation scheme and the code rate for the corresponding channel according to the notified the MCS level.

Where the network side transmits the first indication information and the second indication information in the following two schemes:

In a first scheme, the network side transmits the first indication information and the second indication information via indication information items in DCI.

Particularly the network side can notify the UE of the MCS table corresponding to the determined MCS level in 1-bit indication information in DCI, and for example, if the 1-bit indication information is 0, then the UE is instructed to use the first MCS table and determine the modulation and coding scheme for the channel scheduled by the network side for the UE according to the received MCS level; and if the 1-bit indication information is 1, then the UE is instructed to use the second MCS table and determine the modulation and coding scheme for the channel scheduled by the network side for the UE according to the received MCS level; and The network side can notify the UE of the determined MCS level in 5-bit or another number of bits of indication information in DCI, where the number of bits in the first indication information can be determined from the number of MCS levels corresponding to the first MCS table.

Preferably the network side transmits the first indication information and the second indication information via indication information items in DCI transmitted in a UE-specific search space without any influence upon an existing mechanism to indicate an MCS level.

It shall be noted that in the existing mechanism to indicate an MCS level, the network side schedules the UE in a common search space using an MCS table specified in the 3GPP LTE Rel-11 and earlier releases.

It shall be noted that the first scheme can be applicable to both downlink and uplink scheduling, where when a modulation scheme at a higher order is supported over a downlink channel, the UE can determine a modulation and coding scheme of data of a PDSCH according to an MCS table corresponding to an MCS level corresponding to the PDSCH indicated in DCI; and when a modulation scheme at a higher order is supported over an uplink channel, the UE can determine a modulation and coding scheme of data of a PUSCH according to an MCS table corresponding to an MCS level corresponding to the PUSCH indicated in DCI.

In a second scheme, the network side transmits the second indication information via higher-layer signalling and the first indication information in an indication information item in DCI;

Where the higher-layer signalling can be Radio Resource Control (RRC) signalling, Medium Access Control (MAC) signalling, etc.

Preferably the network side transmits the first indication information in an indication information item in DCI transmitted in a UE-specific search space without any influence upon an existing mechanism to indicate an MCS level.

It shall be noted that the second scheme can be applicable to both a downlink PDSCH and an uplink PUSCH, where when a modulation scheme at a higher order is supported over the downlink PDSCH, the UE can determine a modulation and coding scheme of data of the PDSCH according to an MCS table corresponding to an MCS level corresponding to the PDSCH notified by higher-layer signalling; and when a modulation scheme at a higher order is supported over the uplink PUSCH, the UE can determine a modulation and coding scheme of data of the PUSCH according to an MCS table corresponding to an MCS level corresponding to the PUSCH notified by higher-layer signalling.

Preferably the downlink PDSCH and the uplink PUSCH can be configured by separate higher-layer signalling.

Further, the first MCS table is designed in the following two schemes:

In a scheme A, the number of entries in the first MCS table is not larger than the number of entries in the second MCS table, a part of the modulation schemes in the second MCS table are in the first MCS table, and there are the same TBS indexes corresponding to the same modulation orders in the first MCS table as in the second MCS table;

Preferably the scheme A further includes the following two schemes:

In a scheme A1, there are different MCS indexes corresponding to the same TBS indexes in the first MCS table as in the second MCS table;

An MCS table corresponding to a PDSCH will be described as an example. MCS tables corresponding to other uplink and downlink channels can be designed similarly, so a repeated description thereof will be omitted here.

With the first MCS table as depicted in Table 4, the number of entries in the first MCS table is equal to the number of entries in the second MCS table, where the modulation scheme at the modulation order 4 (16 QAM) in the second MCS table is in the first MCS table, and there are the same TBS indexes corresponding to the modulation scheme at the modulation order 4 in the first MCS table and the second MCS table (see the entries denoted by $I_{MCS}=0$ to 6 in Table 4); the modulation scheme at the modulation order 6 (64 QAM) in the second MCS table is in the first MCS table, and there are the same TBS indexes corresponding to the modulation scheme at the modulation order 6 in the first MCS table and the second MCS table (see the entries denoted by $I_{MCS}=7$ to 18 in Table 4); there are entries in the first MCS table to represent correspondence between a newly added modulation scheme at the modulation order 8 (256 QAM) and the TBS indexes (see the entries denoted by $I_{MCS}=19$ to 28 in Table 4); the modulation scheme at the modulation order 2 (QPSK) in the second MCS table is not in the first MCS table; and there are different MCS indexes corresponding to the respective same TBS indexes in the first MCS table and the second MCS table.

TABLE 4

| MCS Index $I_{MCS}$ | Modulation Order $Q_m$ | TBS Index $I_{TBS}$ |
|---|---|---|
| 0 | 4 | 9 |
| 1 | 4 | 10 |
| 2 | 4 | 11 |
| 3 | 4 | 12 |
| 4 | 4 | 13 |
| 5 | 4 | 14 |
| 6 | 4 | 15 |
| 7 | 6 | 15 |
| 8 | 6 | 16 |
| 9 | 6 | 17 |
| 10 | 6 | 18 |
| 11 | 6 | 19 |
| 12 | 6 | 20 |
| 13 | 6 | 21 |
| 14 | 6 | 22 |
| 15 | 6 | 23 |
| 16 | 6 | 24 |
| 17 | 6 | 25 |
| 18 | 6 | 26 |
| 19 | 8 | 27 |
| 20 | 8 | 28 |
| 21 | 8 | 29 |
| 22 | 8 | 30 |
| 23 | 8 | 31 |
| 24 | 8 | 32 |
| 25 | 8 | 33 |
| 26 | 8 | 34 |
| 27 | 8 | 35 |
| 28 | 8 | 36 |
| 29 | 4 | reserved |
| 30 | 6 | |
| 31 | 8 | |

In a scheme A2, there are the same MCS indexes corresponding to a part of the same TBS indexes in the first MCS table as in the second MCS table;

Also an MCS table corresponding to a PDSCH will be described as an example. MCS tables corresponding to other uplink and downlink channels can be designed similarly, so a repeated description thereof will be omitted here.

With the first MCS table as depicted in Table 5, the number of entries in the first MCS table is equal to the number of entries in the second MCS table, where the entries of $I_{MCS}$=0 to 3 in the first MCS table agree with the entries of $I_{MCS}$=0 to 3 in the second MCS table, that is, there are the same both MCS indexes and TBS indexes corresponding to this part of the modulation orders in the first MCS table and the second MCS table.

TABLE 5

| MCS Index $I_{MCS}$ | Modulation Order $Q_m$ | TBS Index $I_{TBS}$ |
| --- | --- | --- |
| 0 | 2 | 0 |
| 1 | 2 | 1 |
| 2 | 2 | 2 |
| 3 | 2 | 3 |
| 4 | 4 | 9 |
| 5 | 4 | 10 |
| 6 | 4 | 11 |
| 7 | 4 | 12 |
| 8 | 4 | 13 |
| 9 | 4 | 14 |
| 10 | 4 | 15 |
| 11 | 6 | 15 |
| 12 | 6 | 16 |
| 13 | 6 | 17 |
| 14 | 6 | 18 |
| 15 | 6 | 19 |
| 16 | 6 | 20 |
| 17 | 6 | 21 |
| 18 | 6 | 22 |
| 19 | 6 | 23 |
| 20 | 6 | 24 |
| 21 | 6 | 25 |
| 22 | 6 | 26 |
| 23 | 8 | 27 |
| 24 | 8 | 28 |
| 25 | 8 | 29 |
| 26 | 8 | 30 |
| 27 | 8 | 31 |
| 28 | 2 | reserved |
| 29 | 4 | |
| 30 | 6 | |
| 31 | 8 | |

In a scheme B, the number of entries in the first MCS table is larger than the number of entries in the second MCS table, a part or all of the modulation schemes in the second MCS table are in the first MCS table, and there are the same TBS indexes corresponding to the same modulation orders in the first MCS table as in the second MCS table;

Preferably the corresponding entries of all the modulation schemes in the second MCS table are in the first MCS table.

Also an MCS table corresponding to a PDSCH will be described as an example. MCS tables corresponding to other uplink and downlink channels can be designed similarly, so a repeated description thereof will be omitted here.

Where the first MCS table depicted in Table 6 contains all the entries in the second MCS table (see the entries of $I_{MCS}$=0 to 26 in Table 6), and there are also the entries in the first MCS table to represent the correspondence between the modulation scheme at the modulation order 8 and the MCS indexes and TBS indexes.

TABLE 6

| MCS Index $I_{MCS}$ | Modulation Order $Q_m$ | TBS Index $I_{TBS}$ |
| --- | --- | --- |
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 8 | 26 |
| 30 | 8 | 27 |
| 31 | 8 | 28 |
| 32 | 8 | 29 |
| 33 | 8 | 30 |
| 34 | 8 | 31 |
| 35 | 8 | 32 |
| 36 | 8 | 33 |
| 37 | 8 | 34 |
| 38 | 8 | 35 |
| 39 | 8 | 36 |
| 40 | 2 | reserved |
| 41 | 4 | |
| 42 | 6 | |
| 43 | 8 | |

It shall be noted that the meaning of the reserved indication items in the first MCS table according to the embodiment of the invention can be determined from the modulation schemes supported in the first MCS table. For example, modulation orders supported by the reserved indication items in Table 4 are 4, 6 and 8, and in another example, modulation orders supported by the reserved indication items in Table 5 and Table 6 are 2, 4, 6 and 8. The network side can modify the modulation schemes supported in the first MCS table via the reserved indication items without changing the retransmission of TBS's.

It shall be noted that when the network side reconfigures the MCS table used at the network side and the UE by higher-layer signalling, there may be a signalling ambiguity time period during which there is inconsistent understanding by the network side and the UE, for example, the network side instructs the UE in second indication information transmitted via higher-layer signalling to use the first MCS table, but the UE fails to receive the second indication information, and at this time, the network side determines the MCS level using the first MCS table, whereas the UE determines the modulation scheme and the code rate for the channel still using the previous MCS table (e.g., the second MCS table), thus resulting in inconsistent understanding by the network side and the UE.

Preferably in the signalling ambiguity time period during which there is inconsistent understanding by the network side and the UE, if a part or all of the entries in the second MCS table are in the first MCS table, then the network side schedules the UE by determining the MCS level corresponding to the channel scheduled for the UE according to the entries in the first MCS table with the same modulation orders, MCS indexes and TBS indexes as those in the second MCS table; and the network side can schedule the UE using all the MCS levels corresponding to the first MCS table after the network side and the UE have consistent understanding.

Preferably in the signalling ambiguity time period during which there is inconsistent understanding by the network side and the UE, if all of the entries in the second MCS table are in the first MCS table, then the network side schedules the UE by determining the MCS level corresponding to the channel scheduled for the UE according to the second MCS table; and the network side determines the MCS level corresponding to the channel scheduled for the UE according to the first MCS table after the network side and the UE have consistent understanding;

Further, after the network side determines the MCS level corresponding to the channel scheduled for the UE according to the second MCS table, the method further includes:

The network side transmits the first indication information in an indication information item in DCI transmitted in a common search space to notify the UE of the determined MCS level.

The indicating method according to the embodiment of the invention further includes:

The network side notifies the UE of a CQI table used for feeding back a CQI in indication information;

Where the CQI table includes a first CQI table and a second CQI table, and there are CQI indexes, code rates and spectrum efficiencies corresponding to modulation schemes at higher modulation orders than 6 (e.g., 256 QAM, etc.) in the first CQI table, and the second CQI table is a CQI table specified in the 3GPP LTE Rel-11 and earlier releases.

Further, the network side notifies the UE of the CQI table used for feeding back a CQI in the indication information in the following two schemes:

In a first scheme, the network side notifies the UE of the CQI table used for feeding back a CQI via an indication information item in DCI;

Particularly the network side can notify the UE of the CQI table used for feeding back a CQI in 1-bit indication information in the DCI. For example, if the 1-bit indication information in the DCI is 0, then the UE is instructed to feed back a CQI using the first MCS table; and if the 1-bit indication information in the DCI is 1, then the UE is instructed to feed back a CQI using the second MCS table;

It shall be noted that the second indication information for notifying the UE of the MCS table used when the modulation scheme and the code rate corresponding to the channel are determined and the third indication information for notifying the UE of the CQI table used when a CQI is fed back can be the same indication information in the DCI or can be different indication information in the DCI.

Preferably the second indication information and the third indication information is the same indication information in the DCI, that is, both the MCS table and the CQI table used by the UE are indicated in the same indication information.

For example, the MCS table and the CQI table used by the UE are indicated in 1-bit indication information in DCI, and if the 1-bit indication information is 0, then the UE is instructed to feed back a CQI using the first CQI table and to determine the modulating and coding scheme corresponding to the channel using the first MCS table; and if the 1-bit indication information in the DCI is 1, then the UE is instructed to feed back a CQI using the second CQI table and to determine the modulating and coding scheme corresponding to the channel using the second MCS table.

In a second scheme, the network side notifies the UE of the CQI table used for feeding back a CQI via higher-layer signalling;

Where the higher-layer signalling can be RRC signalling, MAC signalling, etc.

Preferably the higher-layer signalling by which the UE is notified of the MCS table and the higher-layer signalling by which the UE is notified of the CQI table is the same higher-layer signalling.

Further, the first CQI table is designed in the following two schemes:

In a scheme a, the number of entries in the first CQI table is not larger than the number of entries in the second CQI table, and there are the same code rates and spectrum efficiencies corresponding to the same modulation schemes in the first CQI table as in the second CQI table.

Preferably the scheme a further includes the following two schemes:

In a scheme a1, there are different CQI indexes corresponding to the same modulation schemes in the first CQI table as in the second CQI table; and With the first CQI table as depicted in Table 7, code rates and spectrum efficiencies corresponding to the 16 QAM and 64 AM modulation schemes in the second CQI table (see the entries denoted by the CQI indexes 1 to 9) are in the first CQI table, and the CQI indexes corresponding to the 16 QAM and 64 AM modulation schemes in the first CQI table are different from the CQI indexes corresponding to the 16 QAM and 64 AM modulation schemes in the second CQI table.

TABLE 7

| CQI index | modulation | code rate × 1024 | efficiency |
|---|---|---|---|
| 0 | | out of range | |
| 1 | 16QAM | 378 | 1.4766 |
| 2 | 16QAM | 490 | 1.9141 |
| 3 | 16QAM | 616 | 2.4063 |
| 4 | 64QAM | 466 | 2.7305 |
| 5 | 64QAM | 567 | 3.3223 |
| 6 | 64QAM | 666 | 3.9023 |
| 7 | 64QAM | 772 | 4.5234 |
| 8 | 64QAM | 873 | 5.1152 |
| 9 | 64QAM | 948 | 5.5547 |
| 10 | 256QAM | xxx | xxx |
| 11 | 256QAM | xxx | xxx |
| 12 | 256QAM | xxx | xxx |
| 13 | 256QAM | xxx | xxx |
| 14 | 256QAM | xxx | xxx |
| 15 | 256QAM | xxx | xxx |

In a second scheme a2, there are the same CQI indexes corresponding to a part of the same modulation schemes in the first CQI table as in the second CQI table.

In a scheme b, the number of entries in the first CQI table is larger than the number of entries in the second CQI table, a part or all of the modulation schemes in the second CQI table are in the first CQI table, and there are the same code rates and spectrum efficiencies corresponding to the same modulation schemes in the first CQI table as in the second CQI table.

Preferably the corresponding entries of all the modulation schemes in the second CQI table are in the first CQI table.

With the first CQI table as depicted in Table 8, all the entries in the second CQI table are in the first CQI table, and there are the same CQI indexes corresponding to the same modulation schemes in the first CQI table as in the second CQI table.

TABLE 8

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |
| 16 | 256QAM | xxx | xxx |
| 17 | 256QAM | xxx | xxx |
| 18 | 256QAM | xxx | xxx |
| 19 | 256QAM | xxx | xxx |
| 20 | 256QAM | xxx | xxx |
| 21 | 256QAM | xxx | xxx |

It shall be noted that the method above can also be applicable to the configuration at the network side of a CQI table used when the UE feeds back a CQI over a PUCCH and a PUSCH; and moreover the network side can configure CQI tables respectively when the UE feeds back a CQI over a PUCCH and over a PUSCH so that the UE feeds back a CQI over a PUCCH and over a PUSCH in the different CQI tables.

Figure 2:
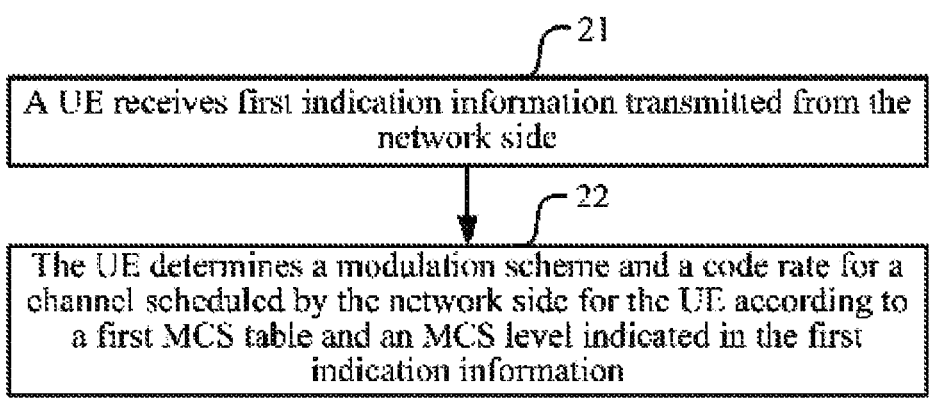
FIG. 2 is a flow chart of a method for receiving MCS indication information according to an embodiment of the invention.

Referring to FIG. 2, a method for receiving MCS indication information according to an embodiment of the invention includes the following operations:

In operation 21, a UE receives first indication information transmitted from a network side; and In operation 22, the UE determines a modulation scheme and a code rate for a channel scheduled by the network side for the UE according to a first MCS table and an MCS level indicated in the first indication information;

Where there are at least corresponding entries of MCS indexes and Transport Block Size (TBS) indexes corresponding to modulation schemes at higher modulation orders than 6 in the first MCS table, and there is a one-to-one correspondence between MCS indexes and MCS levels.

Further, if there is also a second MCS table which is an MCS table specified in the 3GPP LTE Rel-11 and earlier releases, then:

In the operation 11, when the UE receives the first indication information transmitted from the network side, the operation 11 further includes:

The UE further receives second indication information transmitted from the network side and determines from the second indication information the first MCS table or the second MCS table to be used.

Where the first MCS table is designed in the scheme A and the scheme B, and reference can be made to the description above of the scheme A and the scheme B for details thereof, so a repeated description thereof will be omitted here.

Further, the method according to this embodiment further includes:

The UE receives third indication information from the network side and determines from the third indication information a CQI table used for feeding back a CQI;

Where the CQI table includes a first CQI table and a second CQI table, and there are at least corresponding entries of CQI indexes, code rates and spectrum efficiencies corresponding to modulation schemes at higher modulation orders than 6 in the first CQI table, and the second CQI table is a CQI table specified in the 3GPP LTE Rel-11 and earlier releases.

It shall be noted that the first CQI table is designed in the scheme a and the scheme b, and reference can be made to the description above of the scheme a and the scheme b for details thereof, so a repeated description thereof will be omitted here.

Based upon the same inventive idea, an embodiment of the invention further includes a network-side device for transmitting MCS indication information. Since the network-side device addresses the problem under a similar principle to the method above for transmitting MCS indication information, reference can be made to the implementation of the method for an implementation of the network-side device, so a repeated description thereof will be omitted here.

Figure 3:
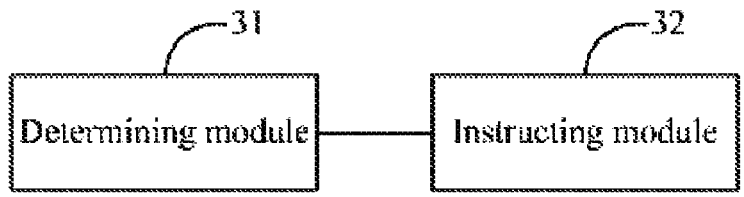
FIG. 3 is a schematic structural diagram of a network-side device for transmitting MCS indication information according to an embodiment of the invention.

Referring to FIG. 3, a network-side device for transmitting MCS indication information according to an embodiment of the invention includes:

A determining module 31 configured to determine a Modulation and Coding Scheme (MCS) level corresponding to a channel scheduled by the network-side for a UE according to channel quality and a first MCS table; and An instructing module 32 configured to notify the UE of the determined MCS level via first indication information to instruct the UE to determine a modulation scheme and a code rate for the channel according to the MCS level;

Preferably the network-side device above is a base station.

There are at least corresponding entries of MCS indexes and Transport Block Size (TBS) indexes corresponding to modulation schemes at higher modulation orders than 6 in the first MCS table, and there is a one-to-one correspondence between MCS indexes and MCS levels;

the first MCS table is designed in the scheme A and the scheme B, and reference can be made to the description above of the scheme A and the scheme B for details thereof, so a repeated description thereof will be omitted here.

Further, if there is also a second MCS table which is an MCS table specified in the 3GPP LTE Rel-11 and earlier releases, then:

The instructing module 32 is further configured:

To instruct the UE in second indication information to use the first MCS table or the second MCS table when the UE determines the modulation scheme and the code rate for the channel according to the notified MCS level.

Further, the instructing module 32 is configured:

To transmit the first indication information and the second indication information via indication information items in DCI; or To transmit the first indication information via an indication information item in the DCI and the second indication information via higher-layer signalling.

Further, the instructing module 32 is configured:

To transmit the first indication information and the second indication information via indication information items in DCI transmitted in a UE-specific search space; or To transmit the first indication information via an indication information item in DCI transmitted in a UE-specific search space and the second indication information via higher-layer signalling.

Further, when the instructing module 32 transmits the second indication information via the higher-layer signalling and a part of entries in the second MCS table are in the first MCS table, the determining module 31 is further configured:

To determine the MCS level corresponding to the channel scheduled for the UE from entries in the first MCS table with the same modulation orders, MCS indexes and TBS indexes as in the second MCS table.

Further, when the instructing module 32 transmits the second indication information via the higher-layer signalling and all of entries in the second MCS table are in the first MCS table, The determining module 31 is further configured to determine the MCS level corresponding to the channel scheduled for the UE according to the second MCS table; and The instructing module 32 is further configured to transmit the first indication information via an indication information item in DCI transmitted in a common search space.

Further, the instructing module 32 is further configured:

To notify the UE of a CQI table used when a CQI is fed back, via third indication information;

Where the CQI table includes a first CQI table and a second CQI table, and there are at least corresponding entries of CQI indexes, code rates and spectrum efficiencies corresponding to modulation schemes at higher modulation orders than 6 in the first CQI table, and the second CQI table is a CQI table specified in the 3GPP LTE Rel-11 and earlier releases;

The first CQI table is designed in the scheme a and the scheme b, and reference can be made to the description above of the scheme a and the scheme b for details thereof, so a repeated description thereof will be omitted here.

Further, the instructing module 32 is configured:

To transmit the third indication information via an indication information item in DCI; or To transmit the third indication information via higher-layer signalling.

Figure 4:
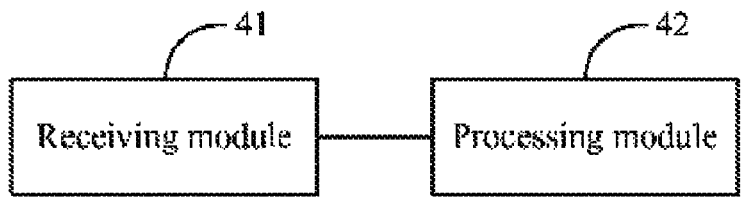
FIG. 4 is a schematic structural diagram of a UE for receiving MCS indication information according to an embodiment of the invention.

Referring to FIG. 4, a User Equipment (UE) for receiving MCS indication information according to an embodiment of the invention includes:

A receiving module 41 is configured to receive first indication information transmitted from a network-side device; and A processing module 42 is configured to determine a modulation scheme and a code rate for a channel scheduled by the network-side device for the UE according to a first MCS table and an MCS level indicated in the first indication information;

Where there are at least corresponding entries of MCS indexes and Transport Block Size (TBS) indexes corresponding to modulation schemes at higher modulation orders than 6 in the first MCS table, and there is a one-to-one correspondence between MCS indexes and MCS levels;

The first MCS table is designed in the scheme A and the scheme B, and reference can be made to the description above of the scheme A and the scheme B for details thereof, so a repeated description thereof will be omitted here.

Further, the receiving module 41 is further configured:

When there is also a second MCS table, to receive second indication information transmitted from the network-side device and to determine from the second indication information the first MCS table or the second MCS table to be used;

Where the second MCS table is an MCS table specified in the 3GPP LTE Rel-11 and earlier releases.

Further, the receiving module 41 is further configured:

To receive third indication information from the network-side device and to determine from the third indication information a CQI table used for feeding back a CQI;

Where the CQI table includes a first CQI table and a second CQI table, and there are at least corresponding entries of CQI indexes, code rates and spectrum efficiencies corresponding to modulation schemes at higher modulation orders than 6 in the first CQI table, and the second CQI table is a CQI table specified in the 3GPP LTE Rel-11 and earlier releases;

The first CQI table is designed in the scheme a and the scheme b, and reference can be made to the description above of the scheme a and the scheme b for details thereof, so a repeated description thereof will be omitted here.

An embodiment of the invention further provides a base station including a processor and a data transceiver interface, where:

the processor is configured to determine a Modulation and Coding Scheme (MCS) level corresponding to a channel scheduled by the base station for a UE according to channel quality and a first MCS table; and to notify the UE of the determined MCS level via first indication information to instruct the UE to determine a modulation scheme and a code rate for the channel according to the MCS level; where there are at least corresponding entries of MCS indexes and Transport Block Size (TBS) indexes corresponding to modulation schemes at higher modulation orders than 6 in the first MCS table, and there is a one-to-one correspondence between MCS indexes and MCS levels;

the data transceiver interface is configured to communicate data between the processor and the UE.

Preferably if there is also a second MCS table which is an MCS table specified in the 3GPP LTE Rel-11 and earlier releases, then:

The processor is further configured:

To instruct the UE in second indication information to use the first MCS table or the second MCS table when the UE determines the modulation scheme and the code rate for the channel according to the notified MCS level.

Preferably the processor is configured:

To transmit the first indication information and the second indication information via indication information items in Downlink Control Information (DCI); or To transmit the first indication information via an indication information item in the DCI and the second indication information via higher-layer signalling.

Preferably the processor is configured:

To transmit the first indication information and the second indication information via indication information items in DCI transmitted in a UE-specific search space; or To transmit the first indication information via an indication information item in DCI transmitted in a UE-specific search space and the second indication information via higher-layer signalling.

Preferably if the processor is configured to transmit the second indication information via the higher-layer signalling and a part of entries in the second MCS table are in the first MCS table, then:

The processor is configured to determine the MCS level corresponding to the channel scheduled for the UE from entries in the first MCS table with the same modulation orders, MCS indexes and TBS indexes as in the second MCS table.

Preferably if the processor is configured to transmit the second indication information via the higher-layer signalling and all of entries in the second MCS table are in the first MCS table, then the processor is further configured:

To determine the MCS level corresponding to the channel scheduled for the UE according to the second MCS table; and To transmit the first indication information via an indication information item in DCI transmitted in a common search space.

Preferably the processor is further configured to notify the UE of a CQI table used when a CQI is fed back, in third indication information;

Where the CQI table includes a first CQI table and a second CQI table, and there are at least corresponding entries of CQI indexes, code rates and spectrum efficiencies corresponding to modulation schemes at higher modulation orders than 6 in the first CQI table, and the second CQI table is a CQI table specified in the 3GPP LTE Rel-11 and earlier releases.

Where the processor is configured to transmit the third indication information via an indication information item in DCI; or to transmit the third indication information via higher-layer signalling.

The invention further provides a User Equipment (UE) including a processor and a data transceiver interface, where:

The processor is configured to receive first indication information transmitted from a base station; and to determine a modulation scheme and a code rate for a channel scheduled by the base station for the UE according to a first MCS table and an MCS level indicated in the first indication information; where there are at least corresponding entries of MCS indexes and Transport Block Size (TBS) indexes corresponding to modulation schemes at higher modulation orders than 6 in the first MCS table, and there is a one-to-one correspondence between MCS indexes and MCS levels;

The data transceiver interface is configured to communicate data between the processor and the base station.

If there is also a second MCS table which is an MCS table specified in the 3GPP LTE Rel-11 and earlier releases, then:

The processor is further configured to receive second indication information transmitted from the network side and to determine from the second indication information the first MCS table or the second MCS table to be used.

The processor is further configured:

To receive third indication information from the network side and to determine from the third indication information a CQI table used for feeding back a CQI;

Where the CQI table includes a first CQI table and a second CQI table, and there are at least corresponding entries of CQI indexes, code rates and spectrum efficiencies corresponding to modulation schemes at higher modulation orders than 6 in the first CQI table, and the second CQI table is a CQI table specified in the 3GPP LTE Rel-11 and earlier releases.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

In the embodiments of the invention, modulation schemes at higher modulation orders are introduced to the existing LTE/LTE-A system to thereby improve the throughput so as to improve the spectrum efficiency; and in the embodiments of the invention, the first MCS table and the first CQI table in which there are entries of the modulation schemes at higher modulation orders can be used in combination with the MCS table and the CQI table specified in the existing 3GPP LTE Rel-11 and earlier releases.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for transmitting Modulation and Coding Scheme (MCS) indication information, wherein the method comprises:
  determining, by a network side, an MCS level corresponding to a channel scheduled by the network side for a UE, according to channel quality and a first MCS table;

notifying, by the network side, the UE of the determined MCS level in first indication information to instruct the UE to determine a modulation scheme and a code rate for the channel according to the MCS level;

wherein there are at least corresponding entries of MCS indexes and Transport Block Size (TBS) indexes corresponding to modulation schemes at higher modulation orders than 6 in the first MCS table, and there is a one-to-one correspondence between MCS indexes and MCS levels;

the method further comprising:

determining, by the network side, if there is also a second MCS table which is an MCS table specified in the 3GPP LTE Rel-11 and earlier releases;

if the network side determines that there is also a second MCS table which is an MCS table specified in the 3GPP LTE Rel-11 and earlier releases, then:

instructing the UE in second indication information to use the first MCS table or the second MCS table when the UE is determining the modulation scheme and the code rate for the channel according to the notified MCS level.

2. The method according to claim 1, wherein, transmitting, by the network side, the first indication information and the second indication information via indication information items in Downlink Control Information (DCI); or transmitting, by the network side, the first indication information via an indication information item in the DCI and the second indication information via higher-layer signalling.

3. The method according to claim 2, wherein, transmitting, by the network side, the first indication information and the second indication information via the indication information items in the DCI comprises:

transmitting, by the network side, the first indication information and the second indication information via the indication information items in the DCI transmitted in a User Equipment-specific search space (UE-specific search space);

transmitting, by the network side, the first indication information via the indication information item in the DCI and the second indication information via the higher-layer signalling comprises:

transmitting, by the network side, the first indication information via the indication information item in the DCI transmitted in a UE-specific search space and the second indication information via the higher-layer signalling.

4. The method according to claim 2, wherein, if the network side transmits the second indication information via the higher-layer signalling and a part of entries in the second MCS table are in the first MCS table, then:

determining, by the network side, the MCS level corresponding to the channel scheduled for the UE comprises:

determining, by the network side, the MCS level corresponding to the channel scheduled for the UE according to entries in the first MCS table with same modulation orders, MCS indexes and TBS indexes as in the second MCS table.

5. The method according to claim 2, wherein if the network side transmits the second indication information via the higher-layer signalling and all of entries in the second MCS table are in the first MCS table, then the method further comprises:

determining, by the network side, the MCS level corresponding to the channel scheduled for the UE according to the second MCS table;

transmitting, by the network side, the first indication information via an indication information item in DCI transmitted in a common search space.

6. The method according to claim 1, wherein the number of entries in the first MCS table is not larger than the number of entries in the second MCS table, a part of modulation schemes in the second MCS table are in the first MCS table, and there are same TBS indexes corresponding to same modulation orders in the first MCS table as in the second MCS table.

7. The method according to claim 6, wherein, there are different MCS indexes corresponding to same TBS indexes in the first MCS table as in the second MCS table; or there are same MCS indexes corresponding to a part of same TBS indexes in the first MCS table as in the second MCS table.

8. The method according to claim 1, wherein the method further comprises:

notifying, by the network side, the UE of a CQI table used when a CQI is fed back, in third indication information;

wherein the CQI table comprises a first CQI table and a second CQI table, and there are at least corresponding entries of CQI indexes, code rates and spectrum efficiencies corresponding to modulation schemes at higher modulation orders than 6 in the first CQI table, and the second CQI table is a CQI table specified in the 3GPP LTE Rel-11 and earlier releases.

9. The method according to claim 8, wherein notifying, by the network side, the UE of the CQI table used when a CQI is fed back, in the third indication information comprises:

transmitting, by the network side, the third indication information via an indication information item in DCI; or transmitting, by the network side, the third indication information via higher-layer signalling.

10. The method according to claim 8, wherein the number of entries in the first CQI table is not larger than the number of entries in the second CQI table, a part of the modulation schemes in the second CQI table are in the first CQI table, and there are same code rates and spectrum efficiencies corresponding to same modulation schemes in the first CQI table as in the second CQI table.

11. The method according to claim 10, wherein there are different CQI indexes corresponding to same modulation schemes in the first CQI table as in the second CQI table; or there are same CQI indexes corresponding to a part of same modulation schemes in the first CQI table as in the second CQI table.

12. A method for receiving Modulation and Coding Scheme (MCS) indication information, wherein the method comprises:

receiving, by a UE, first indication information transmitted from a network side;

determining, by the UE, a modulation scheme and a code rate for a channel scheduled by the network side for the UE according to a first MCS table and an MCS level indicated in the first indication information;

wherein there are at least corresponding entries of MCS indexes and Transport Block Size (TBS) indexes corresponding to modulation schemes at higher modulation orders than 6 in the first MCS table, and there is a one-to-one correspondence between MCS indexes and MCS levels;

the method further comprises:

if the network side determines that there is also a second MCS table which is an MCS table specified in the 3GPP LTE Rel-11 and earlier releases, receiving, by the UE, second indication information transmitted from the network side and determining from the second indication information the first MCS table or the second MCS table to be used.

13. The method according to claim 12, wherein the method further comprises:

receiving, by the UE, third indication information from the network side and determining from the third indication information a CQI table used for feeding back a CQI;

wherein the CQI table comprises a first CQI table and a second CQI table, and there are at least corresponding entries of CQI indexes, code rates and spectrum efficiencies corresponding to modulation schemes at higher modulation orders than 6 in the first CQI table, and the second CQI table is a CQI table specified in the 3GPP LTE Rel-11 and earlier releases.

14. A network-side device for transmitting Modulation and Coding Schemer (MCS) indication information, wherein the network-side device comprises a memory and a processor, wherein the memory is configured to store codes of a computer program and the processor is configured to execute the computer program to:

determine an MCS level corresponding to a channel scheduled by the network-side device for a UE according to channel quality and a first MCS table;

notify the UE of the determined MCS level in first indication information to instruct the UE to determine a modulation scheme and a code rate for the channel according to the MCS level;

wherein there are at least corresponding entries of MCS indexes and Transport Block Size (TBS) indexes corresponding to modulation schemes at higher modulation orders than 6 in the first MCS table, and there is a one-to-one correspondence between MCS indexes and MCS levels;

the processor is further configured to:

determine if there is also a second MCS table which is an MCS table specified in the 3GPP LTE Rel-11 and earlier releases;

if it is determined that there is also a second MCS table which is an MCS table specified in the 3GPP LTE Rel-11 and earlier releases, then:

instruct the UE in second indication information to use the first MCS table or the second MCS table when the UE is determining the modulation scheme and the code rate for the channel according to the notified MCS level.

15. A User Equipment (UE) for receiving MCS indication information, wherein the UE comprises a memory and a processor, wherein the memory is configured to store codes of a computer program and the processor is configured to execute the computer program to:

receive first indication information transmitted from a network-side device;

determine a modulation scheme and a code rate for a channel scheduled by the network-side device for the UE according to a first MCS table and an MCS level indicated in the first indication information;

wherein there are at least corresponding entries of MCS indexes and Transport Block Size (TBS) indexes corresponding to modulation schemes at higher modulation orders than 6 in the first MCS table, and there is a one-to-one correspondence between MCS indexes and MCS levels;

the processor is further configured to:

if the network side determines that there is also a second MCS table which is an MCS table specified in the 3GPP LTE Rel-11 and earlier releases, receive second indication information transmitted from the network side and determine from the second indication information the first MCS table or the second MCS table to be used.

16. The UE according to claim 15, wherein the processor is configured to receive first indication information transmitted from a network-side device and is further configured to:

in response to determining that there is also a second MCS table, receive second indication information transmitted from the network-side device and determine from the second indication information the first MCS table or the second MCS table to be used;

wherein the second MCS table is an MCS table specified in the 3GPP LTE Rel-11 and earlier releases.

17. The UE according to claim 15, wherein the processor is configured to receive first indication information transmitted from a network-side device is further configured to:

receive third indication information from the network-side device and determine from the third indication information a CQI table used for feeding back a CQI;

wherein the CQI table comprises a first CQI table and a second CQI table, and there are at least corresponding entries of CQI indexes, code rates and spectrum efficiencies corresponding to modulation schemes at higher modulation orders than 6 in the first CQI table, and the second CQI table is a CQI table specified in the 3GPP LTE Rel-11 and earlier releases.

* * * * *